(12) United States Patent
Ji et al.

(10) Patent No.: US 10,555,372 B2
(45) Date of Patent: Feb. 4, 2020

(54) ARMREST AND CONTROL METHOD FOR THE SAME

(71) Applicant: DAECHANG CO., LTD., Jeollabuk-do (KR)

(72) Inventors: Jun Dong Ji, Gyeonggi-do (KR); Won Young Chae, Gyeonggi-do (KR); Won Woo Choi, Gyeonggi-do (KR); Myeong Ji O, Gyeonggi-do (KR)

(73) Assignee: DAECHANG CO., LTD., Jeollabuk-Do (KR)

( * ) Notice: Subject to any disclaimer, the term of this patent is extended or adjusted under 35 U.S.C. 154(b) by 632 days.

(21) Appl. No.: 15/275,809

(22) Filed: Sep. 26, 2016

(65) Prior Publication Data

US 2017/0325287 A1    Nov. 9, 2017

(30) Foreign Application Priority Data

| May 9, 2016 | (KR) | 10-2016-0056168 |
| Jul. 15, 2016 | (KR) | 10-2016-0090155 |
| Jul. 15, 2016 | (KR) | 10-2016-0090156 |
| Jul. 15, 2016 | (KR) | 10-2016-0090157 |

(51) Int. Cl.
*B60H 1/22* (2006.01)
*H05B 3/20* (2006.01)
(Continued)

(52) U.S. Cl.
CPC ......... *H05B 1/0236* (2013.01); *B60H 1/2226* (2019.05); *B60N 2/5621* (2013.01); *B60N 2/5685* (2013.01); *B60N 2/75* (2018.02); *H05B 3/34* (2013.01); *B60H 1/0055* (2013.01); *B60H 1/00207* (2013.01); *B60H 1/00271* (2013.01);
(Continued)

(58) Field of Classification Search
None
See application file for complete search history.

(56) References Cited

U.S. PATENT DOCUMENTS

| 3,879,598 A * | 4/1975 | Darling | A47C 17/22 |
| | | | 297/180.15 |
| 2005/0242081 A1* | 11/2005 | Howick | B60N 2/5685 |
| | | | 219/529 |

(Continued)

FOREIGN PATENT DOCUMENTS

| KR | 10-2010-0050658 A | 5/2010 | |
| KR | 101403441 B1 * | 6/2014 | B60N 3/104 |
| WO | WO-2015152470 A1 * | 10/2015 | B60N 2/5628 |

OTHER PUBLICATIONS

WO-2015152470-A1, Kim et al, Oct. 2015, partial translation (Year: 2015).*

*Primary Examiner* — Joseph M Pelham
(74) *Attorney, Agent, or Firm* — The PL Law Group, PLLC

(57) ABSTRACT

An armrest according to one embodiment of the present invention includes a case including a passage which guides a flow of air while the air is introduced and discharged and a through-hole which is formed via the passage to allow the air to be discharged outward, a fan located inside the case and by which the air is introduced and discharged through the passage, a heating element configured to supply heat to the air discharged by the fan and an outer surface of the case, and a supporter configured to support an external force applied to the case in at least two directions to keep a shape of the case.

10 Claims, 17 Drawing Sheets

(51) Int. Cl.
  *H05B 1/02* (2006.01)
  *B60N 2/56* (2006.01)
  *B60N 2/75* (2018.01)
  *H05B 3/34* (2006.01)
  *B60H 1/00* (2006.01)

(52) U.S. Cl.
  CPC ...... *B60H 1/2225* (2013.01); *H05B 2203/003* (2013.01); *H05B 2203/004* (2013.01)

(56) References Cited

U.S. PATENT DOCUMENTS

| | | | | |
|---|---|---|---|---|
| 2014/0339211 | A1* | 11/2014 | Barfuss | B60N 2/002 |
| | | | | 219/202 |
| 2017/0217284 | A1* | 8/2017 | Ji | B60H 1/00292 |
| 2017/0325287 | A1* | 11/2017 | Ji | H05B 1/0236 |
| 2017/0347396 | A1* | 11/2017 | Yeung | H05B 1/0236 |
| 2018/0054858 | A1* | 2/2018 | Dry | B60N 2/5642 |

* cited by examiner

ARMREST AND CONTROL METHOD FOR THE SAME

CROSS-REFERENCE TO RELATED APPLICATION

This application claims priority to and the benefit of Korean Patent Application No. 10-2016-0056168, filed on May 9, 2016, Korean Patent Application No. 10-2016-0090155, filed on Jul. 15, 2016, Korean Patent Application No. 10-2016-0090156, filed on Jul. 15, 2016, and Korean Patent Application No. 10-2016-0090157, filed on Jul. 15, 2016, the disclosures of which are incorporated herein by reference in their entirety.

BACKGROUND

1. Field of the Invention

The present invention relates to an armrest and a control method for the same.

2. Discussion of Related Art

Generally, an armrest disposed at a vehicle is a device which allows a passenger to put his/her arm thereon, and thus a driver or the passenger may take a comfortable position in the vehicle while putting his/her arm on the armrest. The armrest used to store things used by the passenger or to support the passenger's arm sit on a front side is installed between a driver's seat and a front passenger seat in the vehicle or at a middle portion between rear seats. A cup holder, a storage space or the like is disposed at the armrest to accommodate the passenger's goods.

Recently, a method of variously using the armrest is required to maintain comfort in an internal environment of the vehicle. Accordingly, a pad formed of a cushioning material is disposed at a portion of an existing armrest on which a user's arm is put, and a heating wire is disposed at a lower surface of the pad. The heating wire is connected to a temperature sensor and generates heat according to a detected temperature. Since the heat is generated at the portion of the armrest, on which the user's arm is put, according to the detected temperature, the user may stay warm in the vehicle even in the winter time.

However, in the existing armrest, air is not blown to a user side in which the user's arm is put on an upper surface thereof. The temperature may be detected only when the user's arm is put thereon and a surface of the armrest is heated, and thus there is a problem that efficiency thereof is degraded. Also, since the heating wire generates the heat, the user may feel displeasure due to sweat generated from the user's arm when the user's arm is put on the armrest in a hot weather.

SUMMARY

The present invention is directed to providing an armrest which includes a reinforcing member for supporting a predetermined load and prevents an upper portion of the armrest from sinking downward by the reinforcing member.

Also, the present invention is directed to providing an armrest in which a first through-hole and a second through-hole through which air discharged by a fan included in the armrest passes are disposed to cross each other, and thus the air is allowed to pass through a heat-exchanging point via a heating element while being discharged.

Also, the present invention is directed to providing an armrest which includes an infrared heater and in which radiant energy emitted from the infrared heater is reflected and reused to heat air discharged outside the armrest.

Also, the present invention is directed to providing an armrest in which a heating element for transferring heat to a user through heat conduction is disposed at an outer surface of a case.

Also, the present invention is directed to providing an armrest in which an infrared heater is disposed to be spaced a predetermined distance from a heat reflecting member, thereby increasing utilization of radiant heat reflected by the heat reflecting member.

Also, the present invention is directed to providing an armrest in which a controller transmits an operation and stop signal by receiving and reflecting information of a heating part, a fan and a temperature and an operation thereof.

Also, the present invention is directed to providing a method of controlling a fan of an armrest, which is controlled by a controller.

According to an aspect of the present invention, there is provided an armrest including a case including a passage which guides a flow of air while the air is introduced and discharged and a through-hole which is formed via the passage to allow the air to be discharged outward; a fan located inside the case and by which the air is introduced and discharged through the passage; a heating element configured to supply heat to the air discharged by the fan and an outer surface of the case; and a supporter configured to support an external force applied to the case in at least two directions to keep a shape of the case.

The supporter may include a rib which is disposed to support an upper side; and a reinforcing member which is supported by at least one rib and located inside an upper portion of the case to be in close contact with the case.

The armrest may further include a cloth member which is coupled to the heating element and located at one side of the case, and the cloth member may include a hole through which the air passes or may be formed of a mesh material.

In a vehicle including the armrest, the armrest may further include an operating part which controls an operation of the fan and the heating element.

An operation and stop time of the fan or the heating element may be controlled by the operating part, and a controller which controls an operating and stopping time of the fan or the heating element may be further included.

According to another aspect of the present invention, there is provided an armrest including a case having a passage of which an inside and an outside are in communication with each other; a fan configured to allow air to be introduced and discharged through the passage; a heating part located at a route through which the air is moved and configured to generate radiant heat; and a heat reflecting member disposed to reflect the radiant heat generated from the heating part and then to provide the reflected radiant heat to the route through which the air is moved.

The heating part may be an infrared heater, and the infrared heater may be formed in one of a coil shape, a bar shape, a board shape and an arch shape.

The passage may include an inlet passage through which the air is introduced and an outlet passage through which the air is discharged, and the inlet passage and the outlet passage may be formed at a front side and a rear side of the fan based on an air flowing direction, and the heating part may be located inside the outlet passage.

The armrest may further include a cover member which is disposed to prevent the heating part from being damaged from an external shock.

The heat reflecting member may include at least one or more surfaces which reflect the radiant heat upward.

According to still another aspect of the present invention, there is provided an armrest including a passage formed inside a case which forms an exterior and through which air is introduced and guided; a fan disposed inside the passage and configured to circulate the introduced air into a vehicle; one or more heat exchange members configured to heat the air moved by the fan; one or more heating elements located at one side of an upper case forming an upper portion of the case and configured to heat an upper surface thereof; and a controller configured to control the heat exchange member and an heating operation of the heating element.

The controller may include a temperature controller which sets a temperature of each of the heat exchange member and the heating element; and a heating controller which monitors whether each of the heat exchange member and the heating element corresponds to a set temperature.

The temperature controller may allow a user to adjust a temperature to a predetermined stage.

The temperature controller may include a control circuit which controls a control signal including one or more of a current, a voltage and a resistance to set a predetermined stage of the temperature.

The control circuit may include a plurality of signal lines corresponding to predetermined stages to transmit a control signal input to the heat exchange member and the heating element.

According to yet another aspect of the present invention, there is provided a control method of an armrest which comprises a heating part, a fan, a detecting part and a controller, including allowing the heating part to generate heat at one side of a case of the armrest; detecting at least one of a temperature and an operation time of the heating part by the detecting part; transmitting at least one of the detected temperature and operation time to the controller; and determining whether the fan is operated by the controller based on at least one of the detected temperature and operation time.

The fan may receive an operating signal from the controller and then may be operated when the operation time of the heating part detected by the detecting part reaches a predetermined operation time.

The fan may receive an operating signal from the controller and then may be operated when the temperature of the heating part detected by the detecting part reaches a predetermined temperature.

A detecting object of the detecting part may further include an external temperature of the case.

The fan may receive an operating signal from the controller and then may be operated when the external temperature of the case detected by the detecting part is a predetermined temperature or higher.

BRIEF DESCRIPTION OF THE DRAWINGS

The above and other objects, features and advantages of the present invention will become more apparent to those of ordinary skill in the art by describing in detail exemplary embodiments thereof with reference to the accompanying drawings, in which.

DETAILED DESCRIPTION

Hereinafter, exemplary embodiments of the present invention will be described in detail below with reference to the accompanying drawings. However, the embodiments are merely examples and the present invention is not limited thereto.

In the following description, if it is considered that the specific description of related and well known techniques may obscure the gist of the present invention, the specific description will be omitted. Also, the terms used herein are defined according to the functions of the present invention. Thus, the terms may vary depending on a user's or operator's intentions or practices. Therefore, the terms used herein must be understood based on the descriptions made herein.

The technical spirit of the present invention is determined by the claims, and the following embodiments are provided to merely explain the technical spirit of the present invention to those skilled in the art to which the present invention pertains.

For example, a heating element of one embodiment, which will be described below, is a heating wire as a line-type heating element, and a surface-type heating element may also be used. Also, a soundproofing device for preventing noise and vibration generated by a fan is illustrated at a lower side of the fan, but a position thereof is just an example, and various modifications may be made by those skilled in the art.

And hereinafter, to explain an embodiment including an outer cover and also to distinguish between a through-hole formed in the outer cover and a through-hole formed in a case, the through-hole formed in the case will be referred to as a first through-hole, and the through-hole formed in the outer cover will be referred to as a second through-hole.

Also, a heating part 320 is a heat-generating means including at least one or more of a heating element 300, an infrared heater 20 and a heat exchange member 22 which will be described below. Since the heating part 320 described in each of the embodiments is different from each other, it shall be described separately.

Figure 1:
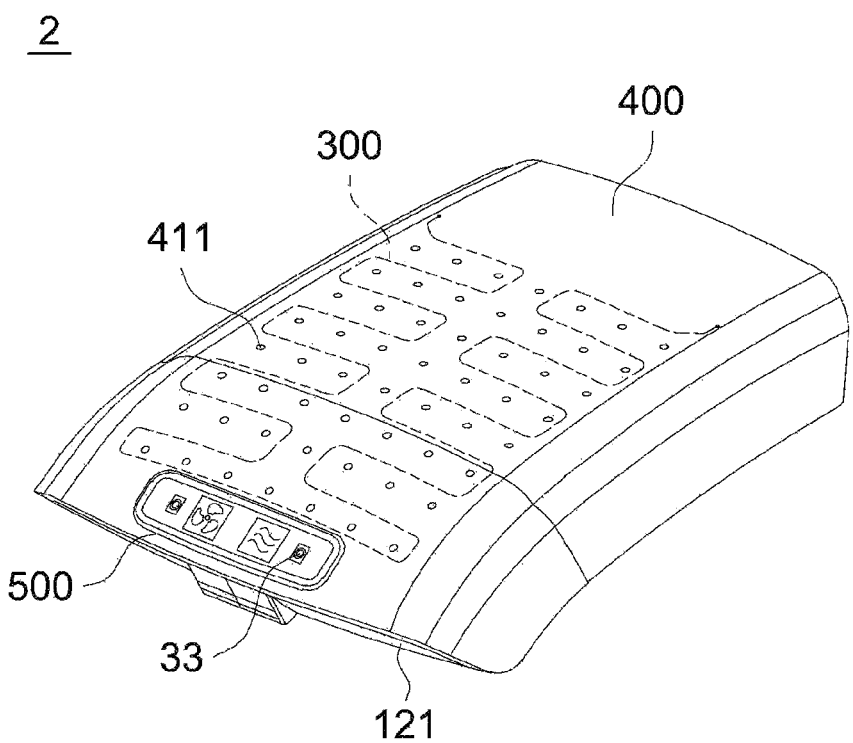
FIG. 1 is a perspective view illustrating an armrest according to one embodiment of the present invention.

FIG. 1 is a perspective view illustrating an armrest 2 according to one embodiment of the present invention.

The armrest 2 may enable an arm of a human body part to rest thereon and may include a storage space which stores goods. In general, the armrest 2 is provided along with a seat and may be installed in at least one or more of a left side and a right side of a driver or a passenger when being installed in a vehicle. When the armrest 2 is installed in the vehicle, the armrest 2 may be in direct contact with a human body and may serve to control an air-conditioning environment in the vehicle. Referring to FIG. 1, the armrest 2 may include a fan 200 (in FIG. 2) which generates forced convection in the vehicle and may have a through-hole 411 through which the air moved by the fan 200 (in FIG. 2) is discharged. The air discharged through the through-hole 411 may be discharged outside the armrest 2 via a heating element 300 which may exchange heat with the air to increase a temperature of the air inside the vehicle.

Also, the heating element 300 included in the armrest 2 may exchange heat with the air, may increase the temperature of the air and may increase the temperature of the air outside the armrest 2 through convection. Furthermore, in an example illustrated in FIG. 1, since the heating element 300 is disposed at an upper side thereof, heat may be transferred from an outer surface of an upper side of the armrest 2 to a user's arm through heat conduction while the arm rests thereon. Of course, this example corresponds to a case in which the human body is in contact with the upper side of the armrest 2, and the heating element 300 may be disposed at a different position to perform the heat-transfer due to contact with other surfaces of the armrest 2.

Meanwhile, an operation part 33 may be further included to enable a temperature and a discharging speed of the air discharged outside the armrest 2 to be controlled by a user. The operation part 33 may include, for example, a temperature adjusting button through which the temperature of the discharged air is determined by the user and an air speed adjusting button through which an air discharging rate is determined. Further, a temperature of the heating element 300 may be increased by an operation of the temperature adjusting button, and if the temperature is increased higher than a temperature determined by the user or overheated beyond a predetermined temperature, electric power supplied to the heating element 300 may be controlled to be cut off by an overheating prevention means which is not illustrated so that a condition for the overheating is not satisfied.

Also, the armrest 2 may further include a display part 500. In FIG. 1, the display part 500 is provided along with the operation part 33. However, the display part 500 and the operating part 33 are different elements from each other and may be separately located at different places. Also, the display part 500 may display an air volume according to a rotating speed of the fan 200 and a heating degree of the heating element 300 through visual and aural information. For example, a display may be a means for displaying information in the form of the visual information.

Meanwhile, the armrest 2 may further include a controller 50. The controller 50 may be located inside or outside the armrest 2, may be connected to the fan 200 and may be connected to at least one of an infrared heater 20 (in FIG. 2) and the heating element 300. Here, the connection may be achieved through a detecting part, and the detecting part may be an internal temperature detecting part, an external temperature detecting part and an operation detecting part. The internal temperature detecting part is located inside a case 100, connected to a means of the heating part 320 (300, 20 and 22) included in the armrest 2 to detect a heating temperature of the means and then transmits the detected heating temperature to the controller 50. Also, the operation detecting part may detect information related to an operation of the heating part 320 (300, 20 and 22) and may transmit the information related to the detected operation to the controller 50. Further, the operation detecting part may transmit the information related to the operation, such as whether or not the fan 200 is operated and RPM of the fan 200, to the controller 50.

The above-described armrest 2 of the present invention will be described in detail through various embodiments referring to FIGS. 2 to 14.

Figure 2:
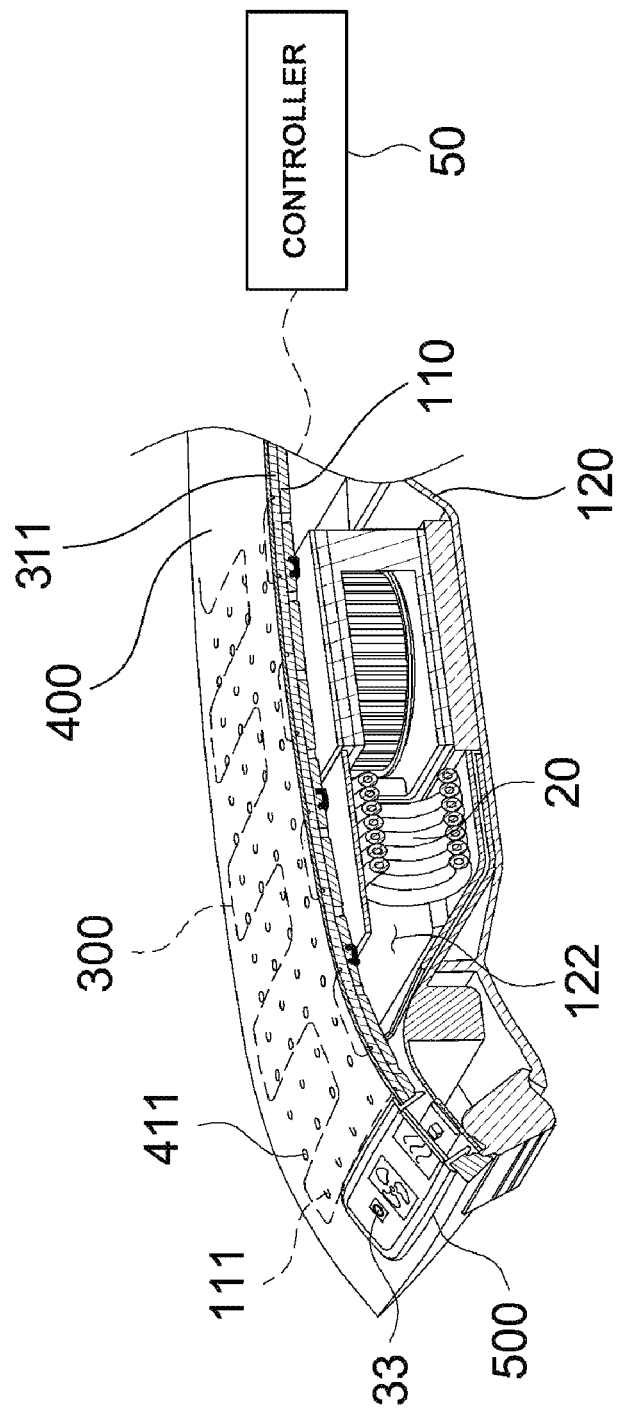
FIG. 2 is a perspective cross-sectional view illustrating an internal structure of the armrest according to one embodiment of the present invention.

FIG. 2 is a perspective cross-sectional view illustrating an internal structure of the armrest 2 according to one embodiment of the present invention.

One embodiment of the present invention will be described in detail with reference to FIG. 2. The armrest 2 may include the case 100, the fan 200, the heating element 300 and a supporter 10. Further, the armrest 2 may further include an outer cover 400 which surrounds at least a part of an outer surface of the case 100, and the operation part 33 which controls the fan 200 and the heating element 300.

Here, the case 100 includes an upper case 110 and a lower case 120, and the cases 110 and 120 may be vertically disposed and coupled to each other. Of course, whether to couple the cases 110 and 120 and a coupling method thereof may be variously changed by those skilled in the art, and thus the present invention is not limited thereto. The upper case 110 may include a first through-hole 111. Also, the lower case 120 may form passages 121 and 122 (in FIGS. 3A and 3B), through which air is introduced into or discharged from the case 100, by being coupled with the upper case 110.

Also, the fan 200 may be located inside the case 100 to be rotated, and the air may be moved by the rotation thereof. By movement of the air, the air may be introduced to the fan 200 through the inlet passage 121 (in FIGS. 3A and 3B) formed to introduce the air and may be discharged toward the outlet passage 122 formed to discharge the air through the fan 200. Here, the discharged air may be discharged outside the case 100 through the first through-hole 111 included in the upper case 110. However, as illustrated in FIG. 1, when the outer cover 400 is included, the air may further pass through a second through-hole 411 formed in the outer cover 400 and then may be discharged outside the armrest 2. Here, assuming that each of the through-holes 111 and 411 is formed in a circular shape, the through-holes 111 and 411 may be disposed at any position except a concentric position. That is, the first through-hole 111 and the second through-hole 411 may be alternately disposed at a predetermined distance from each other in an upper surface of the case 100.

The above-described air flowing process may further include a heat exchange process between the air and the heating element 300. The heating element 300 may be a cord heater as a line-type heating element or a surface-type heating element. However, an example in which the heating element is configured with a heating wire will be described with reference to FIG. 1. The heating element 300 may be located at a side of the upper case 110. Specifically, the heating element 300 may be arranged between the first through-hole 111 and the second through-hole 411 within a predetermined distance. This arrangement may be a structure which increases a heat-exchange area and delays a heat-exchange time between the air and the heat element 300 when the air is discharged outside the armrest 2.

Also, the heating element 300 may be located to be in contact with one surface of a material having high air-permeability when being located at the side of the upper case 110. Here, the material having the high-permeability may be a cloth member 310, such as a fabric or non-woven fabric, formed in a mesh structure. Further, when a shock or a weight like a load is applied to the armrest 2 from an outside, the cloth member 310 may perform a cushion function to alleviate at least a part thereof. Also, when the heating element 300 generates heat, the cloth member 310 may serve to prevent the heat from being directly conducted to the outer cover 400, thereby preventing the outer cover 400 from being damaged, and may also serve to ensure an air passage while the air is discharged outside the armrest 2.

Figure 3A:
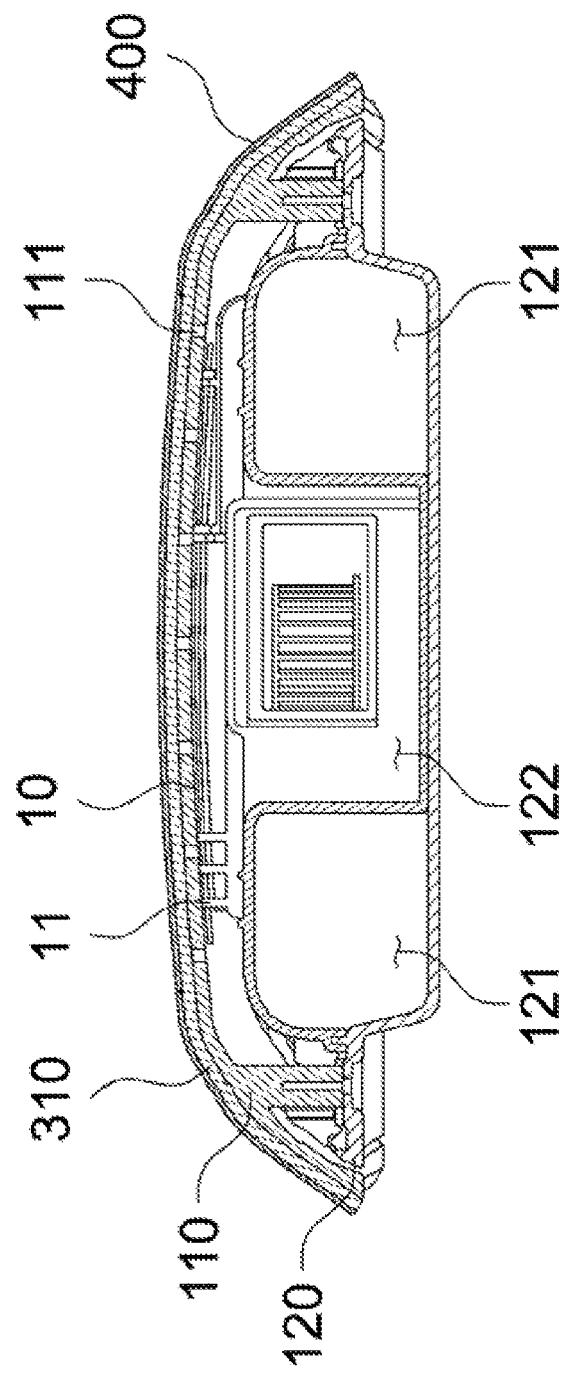
FIG. 3A is a front cross-sectional view of a supporter according to one embodiment of the present invention.
Figure 3B:
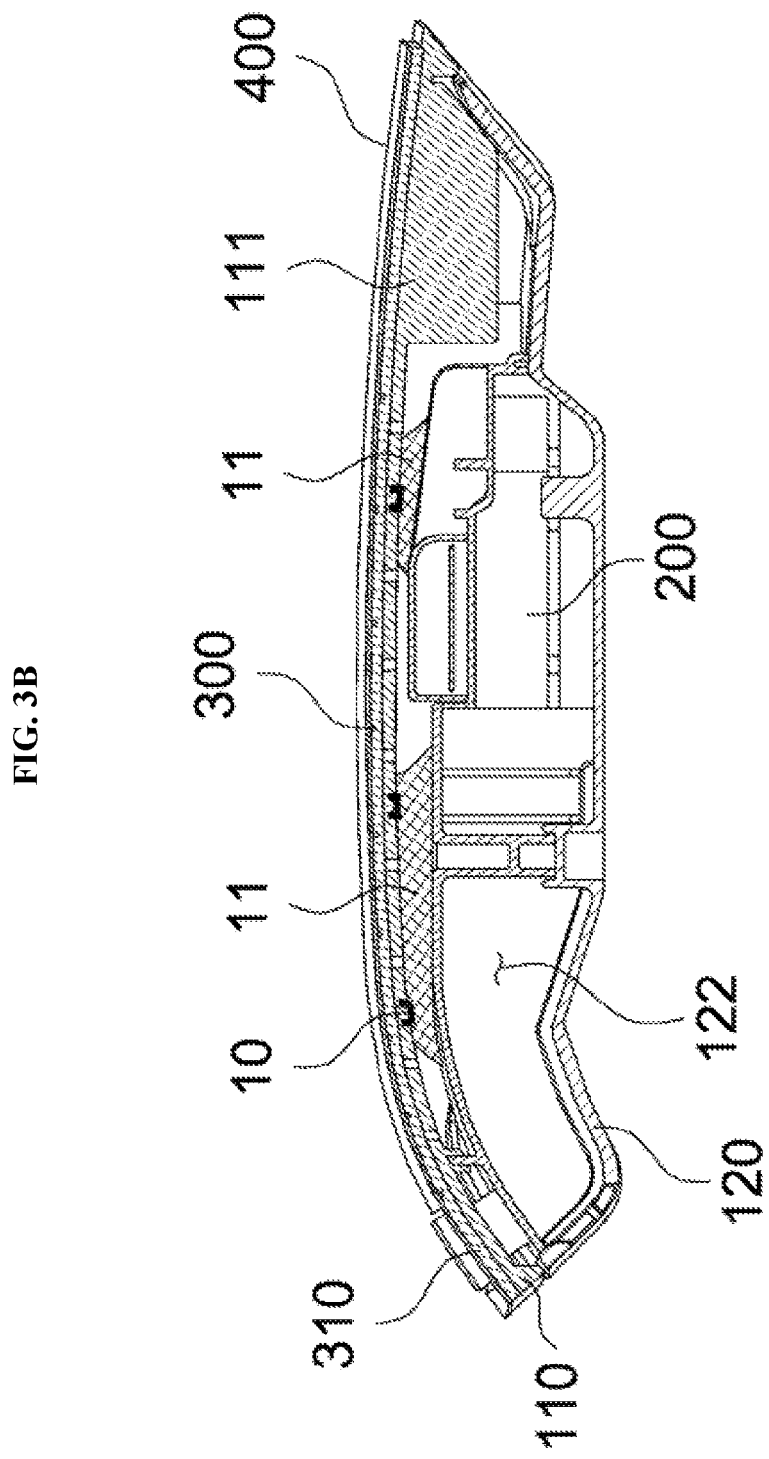
FIG. 3B is a side cross-sectional view of the supporter according to one embodiment of the present invention.

FIG. 3A is a front cross-sectional view of the supporter 10 according to one embodiment of the present invention, and FIG. 3B is a side cross-sectional view of the supporter 10 according to one embodiment of the present invention.

First, referring to FIG. 3A, a reinforcing member 11 of the supporter 10 may be formed to horizontally extend and may be in close contact with the upper case 10. The close contact may be achieved by upwardly supporting the reinforcing member 11 using a rib. Here, the passages 121 and 122 may be formed at the lower case 120 to be divided in the form of a concavo-convex shape, and the rib may be formed to extend from an upper surface of an upward convex portion of the concavo-convex shape toward the upper case 110. Also, the rib may be formed to extend from an external structure of the fan 200 toward the upper case 110.

Further, referring to FIG. 3B, a shape of the rib may be formed so that one rib supports a plurality of reinforcing members 11. The rib may be variously modified as long as it is formed to extend upward from a structure inside the case 100 and thus supports the reinforcing member 11. However, the rib is formed so that the air discharged from the fan 200 passes through the first through-hole 111 and may be formed to maximally ensure the passages.

Figure 4:
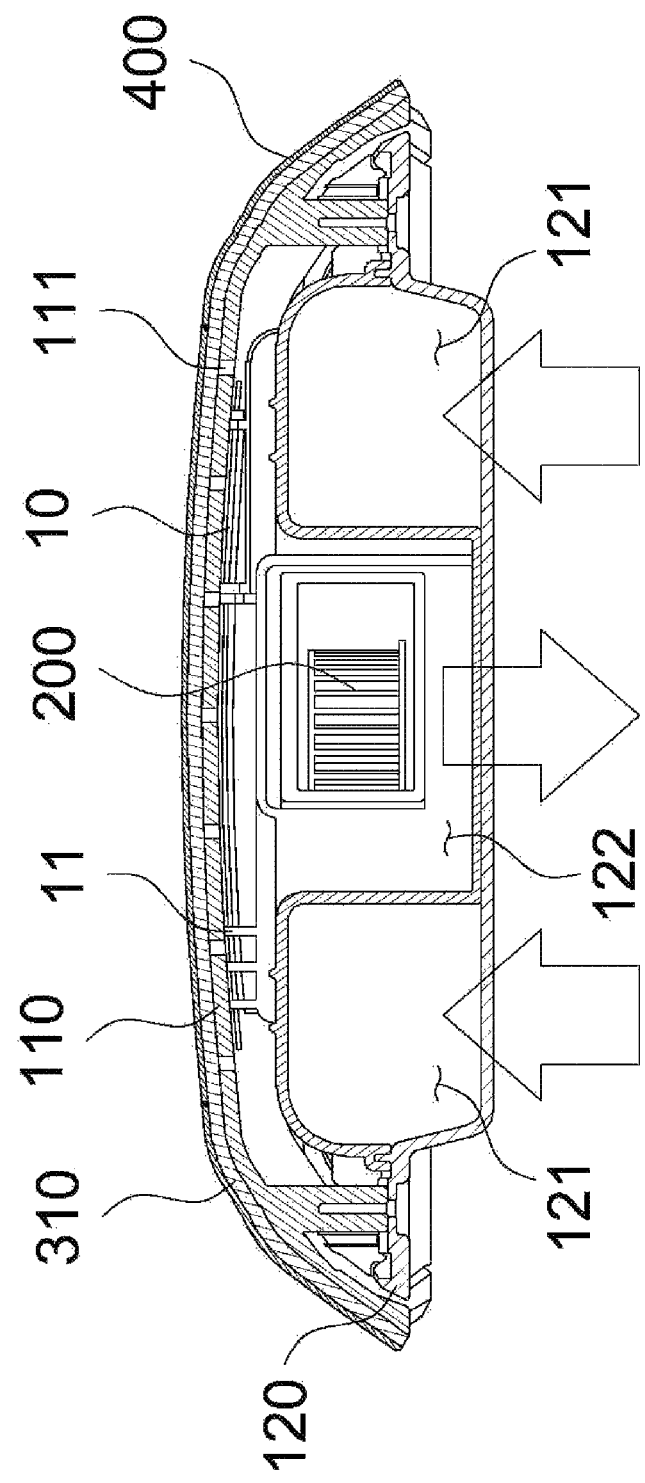
FIG. 4 is a cross-sectional view illustrating an inlet passage through which air is introduced into the armrest according to one embodiment of the present invention, and an outlet passage through which the air is discharged by a fan.

FIG. 4 is a cross-sectional view illustrating the inlet passage 121 through which the air is introduced into the armrest 2 according to one embodiment of the present invention, and an outlet passage 122 through which the air is discharged by the fan 200.

Referring to FIG. 4, to provide the air from the armrest 2, the fan 200 is located inside the case 100, and the armrest 2 may include the passages 121 and 122 through which the air is introduced and discharged by the fan 200. The passages 121 and 122 include the inlet passage 121 through which the air is introduced into the armrest 2 and the outlet passage 122 through which the air is discharged from an inside of the armrest 2 by the fan 200 and may further include a passage which passes through the outlet passage 122 and the through-holes 111 and 411. Here, the passages 121 and 122 may be formed by a structure of the lower case 120, and a passage formed at the rear of the outlet passage 122 based on an air flowing direction may be secured by the supporter 10.

Specifically, according to the embodiment, the supporter 10 may be formed to extend from an upper portion of a structure forming the inlet passage 121 and may upwardly support a lower surface of the upper case 110. By such support, a predetermined interval between the upper case 110 and the structure forming the passages 121 and 122 as a part of the lower case 120 may be maintained, and the predetermined interval may be a space through which the air passed through the outlet passage 122 is moved to the first through-hole 111. The air may be discharged inside the case 100 through the plurality of first through-holes 111 via the space.

Figure 5:
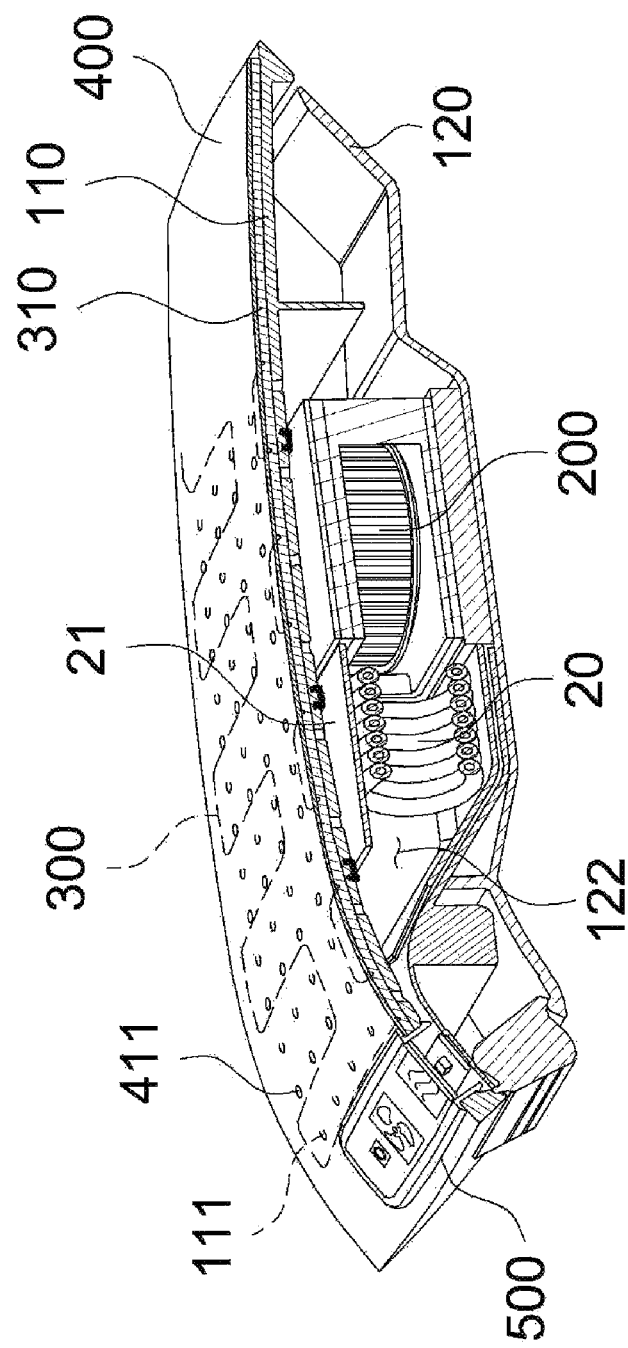
FIG. 5 is a perspective cross-sectional view illustrating an internal structure of an armrest according to another embodiment of the present invention.

FIG. 5 is a perspective cross-sectional view illustrating an internal structure of an armrest 2 according to another embodiment of the present invention.

As described above, the above-described heating element 300 may heat the air discharged from the fan 200 and thus may control a temperature inside the vehicle by convection, and may also be coupled to the case 100 to be adjacent to a portion which is in contact with the human body (e.g., the arm). Therefore, the air-conditioning environment in the vehicle may be pleasantly promoted through the convection using the heated air.

Referring to FIG. 5, the heating part 320 (300 and 20) may be located inside the case 100. In this case, the armrest 2 may include the case 100, the fan 200 and the heating part 320 (300 and 20). Here, the heating part 320 may be the infrared heater 20, the armrest 2 may include a heat reflecting member 21. Hereinafter, an example in which the heating part 320 is the infrared heater 20 will be described. The heat reflecting member 21 may be located around the infrared heater 20. For example, the heat reflecting member 21 may be located adjacent to an inner surface of the case 100 and may be included in the armrest 2 by being fixed, seated or disposed at an internal space of the heat reflecting member 21.

Specifically, the case 100 in the configuration may be divided into the upper case 110 and the lower case 120. The dividing includes a case in which the upper case 110 and the lower case 120 are separate members which are physically detachable and a case in which the upper case 110 and the lower case 120 are formed through a method such as injection-molding to be functionally distinguished. The upper case 110 includes the first through-hole 111 through which the air is discharged outside the armrest 2. The first through-hole 111 may be formed so that the air is discharged outside the armrest 2 via the passages 121 and 122 formed in the case 100 and, for example, may be formed to extend upward from a place at which the arm of the human body is located.

Also, the infrared heater 20 may be located inside the outlet passage 122. When the infrared heater 20 is located inside the inlet passage 121, an air moving distance from a heating point to a discharging point is increased, and thus the air may be heated and then may be cooled while being moved. Accordingly, such a structure may be formed to reduce the air moving distance from the heating point to the discharging point. For heating efficiency, armrest 2 may further include the heat reflecting member 21. The heat reflecting member 21 enables the discharged heat to be reused by reflecting heat, particularly, radiant heat emitted from the infrared heater 20 and then applying the heat in an air flowing direction.

Here, a space in which the air is heated by the heat reflecting member 21 may be formed in a shape in which front and rear sides of the passage are in communication with each other. That is, as illustrated in FIG. 5, a side of the first through-hole 111 may be in communication with a side of the fan 200, and thus the air may pass therethrough. As illustrated in FIG. 2, when the infrared heater 20 is formed in a coil type, a large amount of air may pass through an inside of the coil, and the air may be heated by the infrared heater 20 while passing through the inside thereof.

Further, the radiant heat emitted outside may be reused by reflecting the heat emitted outside the coil to the space, in which the air is heated, other than the heat emitted to the inside of the coil by heat generation of the infrared heater 20. In the case 100, since the air may not stand still due to an operation of the fan 200 but may continuously flow, it may be difficult to heat the air through the convection due to a flowing speed of the air. Therefore, the heating efficiency may be increased by reusing the radiant heat emitted outside the coil in the space in which the air is heated.

Figure 6A:
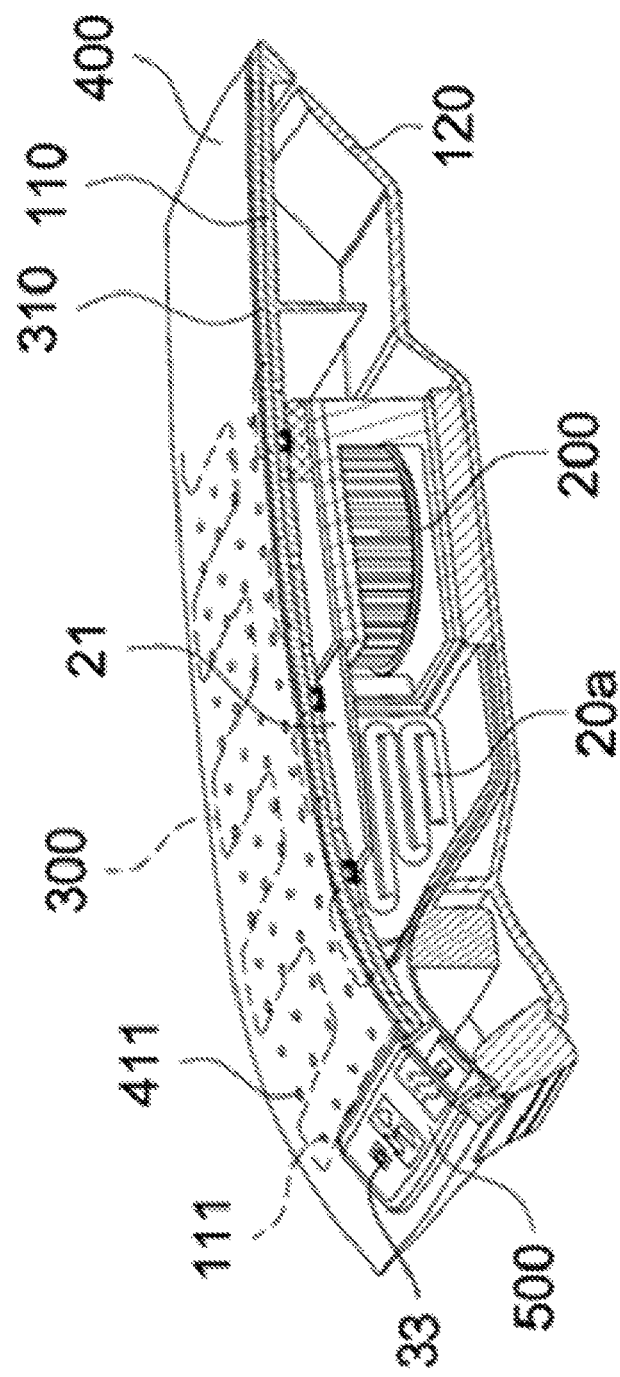
FIG. 6A is a side cross-sectional view of an armrest according to still another embodiment of the present invention.
Figure 6B:
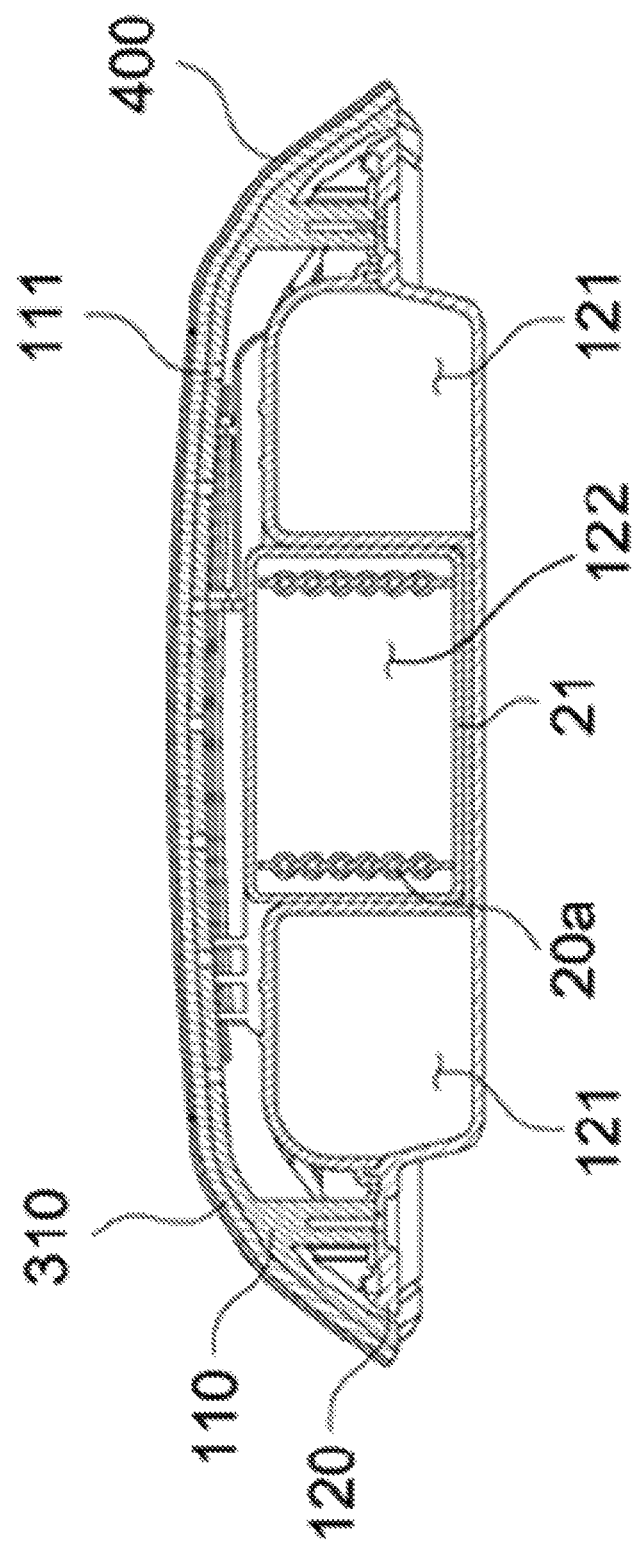
FIG. 6B is a front cross-sectional view of the armrest according to still another embodiment of the present invention.

FIG. 6A is a side cross-sectional view of the armrest according to still another embodiment of the present invention, and FIG. 6B is a front cross-sectional view of the armrest 2 according to still another embodiment of the present invention.

Referring to FIGS. 6A and 6B, an infrared heater 20a may be formed to have a different shape from that of the infrared heater 20 illustrated in FIG. 5. Therefore, differences will be mainly described, and description of the same portions as those in the armrest 2 of FIG. 5 will be omitted.

The infrared heater 20a may be formed in a board shape. The infrared heater 20a may be disposed in a plate shape to be adjacent to the heat reflecting member 21. For example, as illustrated in FIGS. 6A and 6B, the infrared heater 20a may be disposed so as not to interrupt a flow of the air in the outlet passage 122. Also, in FIGS. 6A and 6B, an example in which the infrared heater 20a is disposed at both of opposed side surfaces of the heat reflecting member 21 is illustrated. However, the infrared heater 20a may not be disposed in opposed directions. Such an arrangement of the infrared heater 20a may be disposed in consideration of the flow of the air, i.e., pressure drop and heat exchange efficiency and may be changed by a wall surface structure according to a shape of each of the passages 121 and 122.

In FIGS. 6A and 6B, a left side surface and a right side surface of the heat reflecting member 21 in the outlet passage 122 may be covered by the infrared heater 20a. Therefore, in this case, a portion which heats the air through the radiant heat due to a heat reflecting effect may be upper and lower surfaces of the heat reflecting member 21. When the infrared heater 20a is formed to have a circular cross section, the heat is emitted from an outer circumferential surface thereof, and thus the radiant heat which is not emitted to a place at which the infrared heaters 20a face each other may be emitted in one direction and may also be reapplied to the air by the heat reflecting member 21.

Figure 7A:
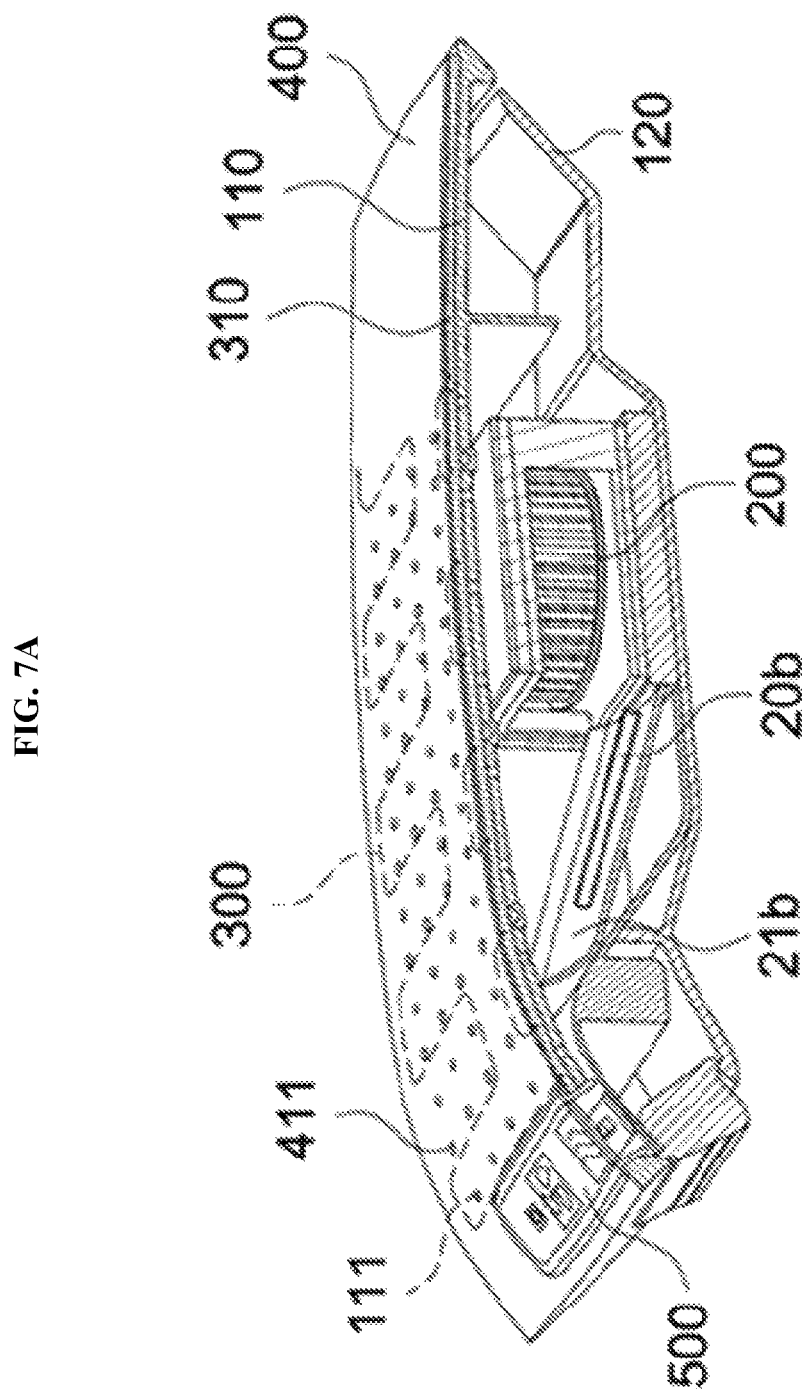
FIG. 7A is a side cross-sectional view of an armrest according to yet another embodiment of the present invention.
Figure 7B:
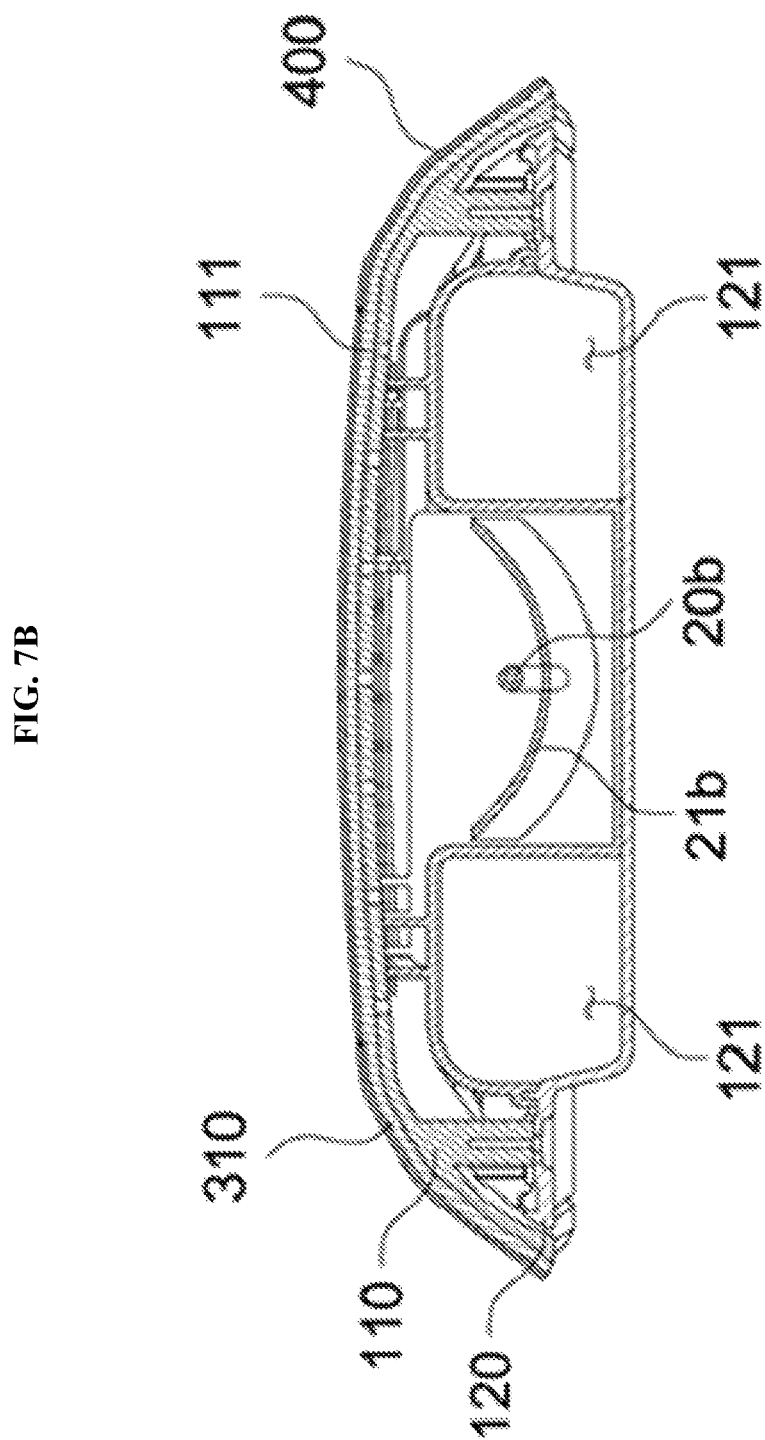
FIG. 7B is a front cross-sectional view of the armrest according to yet another embodiment of the present invention.

FIG. 7A is a side cross-sectional view of the armrest 2 according to yet another embodiment of the present invention, and FIG. 7B is a front cross-sectional view of the armrest 2 according to yet another embodiment of the present invention.

Referring to FIGS. 7A and 7B, an infrared heater 20b and a heat reflecting member 21b may be formed to have different shapes from those of the infrared heaters 20 and 20a and the heat reflecting member 21 illustrated in FIGS. 5 and 6. Therefore, differences will be mainly described, and description of the same portions as those in the armrest 2 of each of FIGS. 5 and 6 will be omitted.

The infrared heater 20b may be formed in a bar shape. The infrared heater 20b may be located to be spaced apart from the heat reflecting member 21b at a predetermined interval and may be disposed above the heat reflecting member 21b. For example, as illustrated in FIGS. 7A and 7B, the infrared heater 20a may be disposed so as not to interrupt the flow of the air in the outlet passage 122. Also, in the case of FIGS. 6A and 6B, the infrared heater 20a disposed at both of the opposed side surfaces of the heat reflecting member 21 is illustrated. However, in an example illustrated in FIGS. 7A and 7B, the heat reflecting member 21b may be disposed concavely upward, and the bar-shaped infrared heater 20b may be disposed above the heat reflecting member 21b to be spaced apart from the heat reflecting member 21b at a predetermined interval. As illustrated in FIGS. 7A and 7B, the heat reflecting member 21b may be obliquely located in the case 100. The reflected radiant heat may be collected at a center of an upper side. Here, the reflected radiant heat is the radiant heat which is initially emitted downward from the infrared heater 20b, thus may be collected at the center while being reflected by the concave heat reflecting member 21b and may heat the air which passes by an upper side of the heat reflecting member 21b.

However, when the heat reflecting member 21b is formed in a flat shape instead of the concave shape, the reflected radiant heat is directed to an inner side surface of the case 100, and thus the radiant heat used to heat the air may be reduced. Therefore, the heat reflecting member 21b may be formed in the concave shape so that an amount of the radiant heat used to the heat the air is increased. Also, the heat reflecting member 21b in the FIGS. 7A and 7B may have a function of reflecting the heat and may also be a part of the outlet passage 122. Therefore, the heat reflecting member 21b having a passage function and the infrared heater 20b may be disposed in parallel or almost parallel with each other. Due to such an arrangement, the flow of the air may not be interrupted. However, an arrangement structure of the heat reflecting member 21b and the infrared heater 20b may be varied in consideration of the pressure drop and the heat exchange efficiency by those skilled in the art.

The above-described heat reflecting members 21 and 21b may be formed of or plated with a predetermined material to increase heat reflecting efficiency. For example, the heat reflecting members 21 and 21b may be formed of or plated with one of silver, chrome, aluminum and nickel.

Further, each of the above-described infrared heaters 20, 20a and 20b may further include a cover member (not shown) which is formed of a metallic material or the like to prevent the infrared heaters 20, 20a or 20b from being damaged by vibration of the vehicle or a shock applied from an outside to the armrest 2. The cover member (not shown) may be located between the heat reflecting member 21 or 21b and the case 100 and may alleviate the vibration and the shock applied to the infrared heaters 20, 20a or 20b and the heat reflecting members 21 or 21b.

Figure 8:
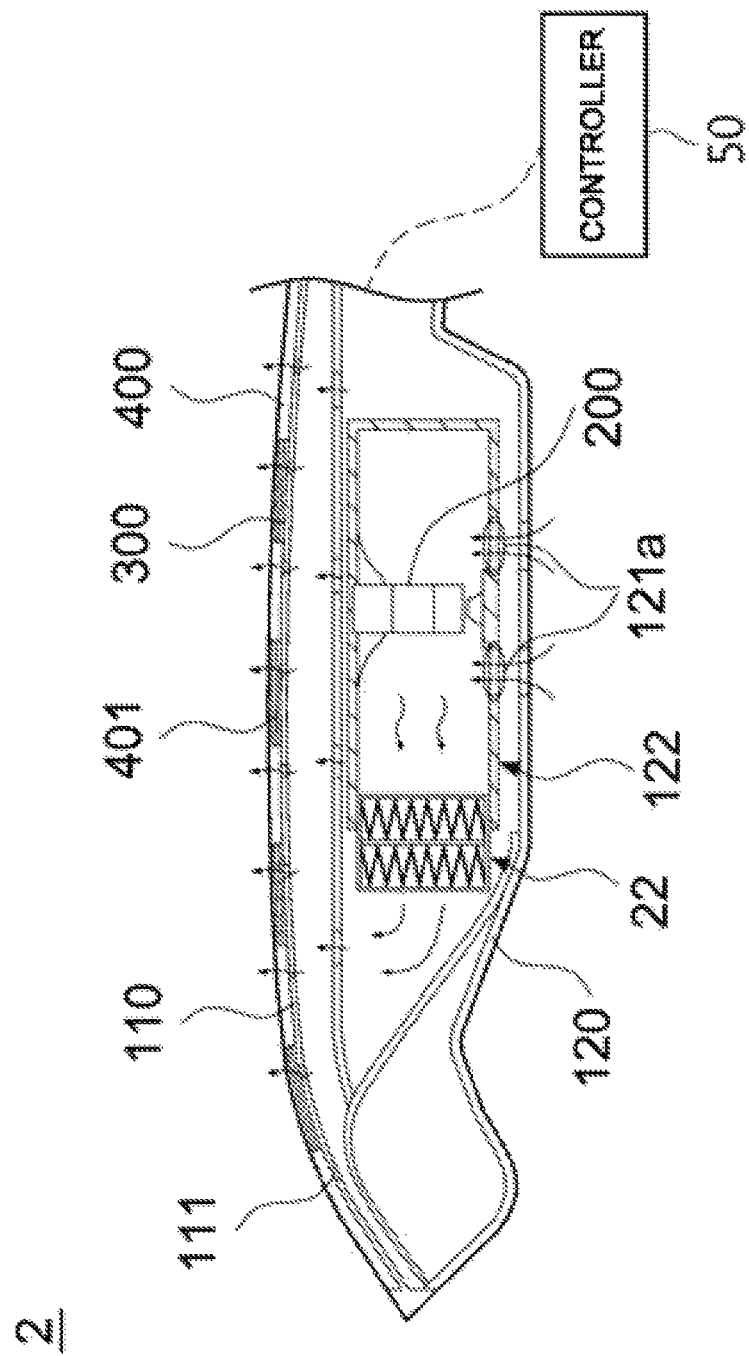
FIG. 8 is a view illustrating an armrest according to yet another embodiment of the present invention.

FIG. 8 is a view illustrating an armrest 2 according to yet another embodiment of the present invention.

Referring to FIG. 8, the armrest 2 may include the case 100 (110 and 120), the fan 200 and the heat exchange member 22.

The heat exchange member 22 may be disposed at one side of the outlet passage 122 and may be formed to occupy one surface of the outlet passage 122. The heat exchange member 22 may heat the air. The air in the case 100 may be blown by the fan 200 and may be heated by the heat exchange member 22 disposed inside the case 100. The heated air may flow toward the first through-hole 111 via the inside of the armrest 2. Here, the heat exchange member 22 may include a surface surface-treated with a material including at least one of aluminum oxide, magnesium oxide, sodium oxide, zirconium oxide, potassium oxide, graphene and carbon nano-tubes (CNTs).

Further, in the armrest 2, a cushion member 401 may be disposed at a side of the upper case 110. The cushion member 401 may be disposed at a side of the heating element 300 which is in contact with one or more surfaces of the upper case 110 and the outer cover 400. Also, an air-passing hole may be formed in the cushion member 401 or the cushion member 401 may be formed of a mesh material so that the air discharged through the first through-hole 111 passes therethrough. For example, the cushion member 401 may be disposed between the heating element 300 and the outer cover 400, and thus the heating element 300 inside the outer cover 400 may not be exposed to the user so that the user is prevented from being burned due to direct heat transfer and heat exchange with the air is performed.

Figure 9:
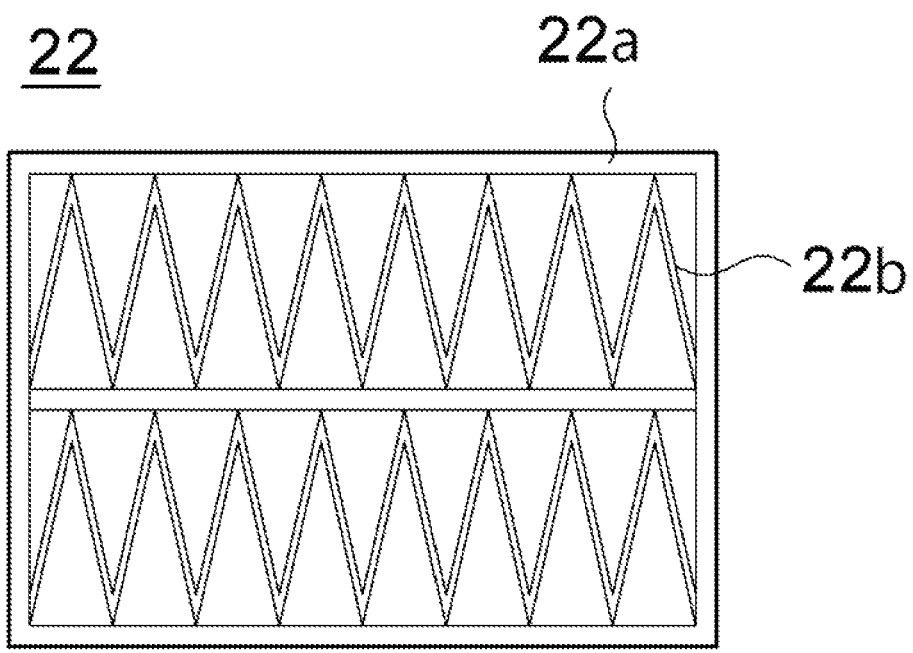
FIG. 9 is a view illustrating a heat exchange member according to yet another embodiment of the present invention.

FIG. 9 is a view illustrating a heat exchange member 22 according to yet another embodiment of the present invention.

Referring to FIG. 9, the heat exchange member 22 may include a frame 22a and a heating wire 22b, and the heating wire 22b may be disposed in the frame 22a. Specifically, the heating wire 22b may be disposed in a zigzag shape to be arranged from one side of the frame 22a to the other side thereof with a predetermined slope. The predetermined slope may be formed within an acute angle. The frame 22a may be formed at a space at which the air is permeable other than a place at which the heating wire 22b is disposed. Therefore, the air introduced into an inlet passage 121a may be heated by the heating wire 22b while being blown by the fan 200 and passing through the heating wire 22b of the heat exchange member 22.

Figure 10:
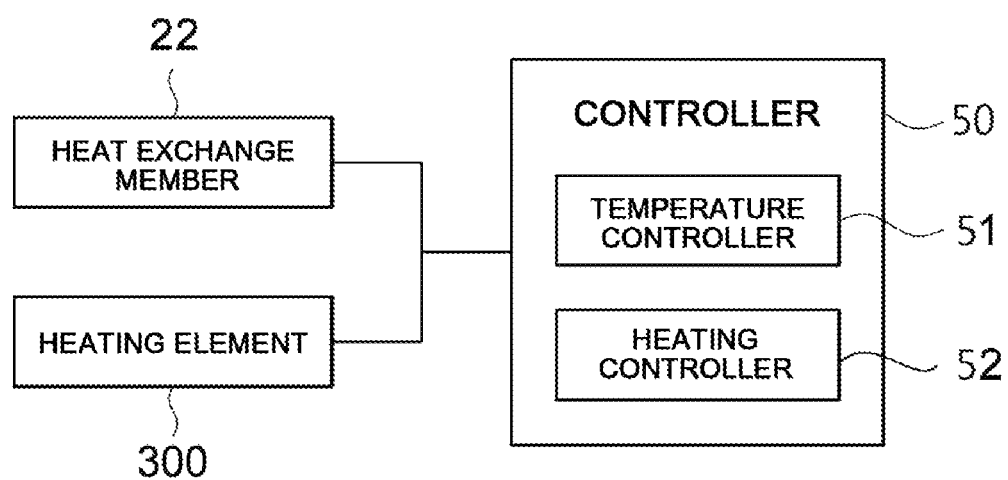
FIG. 10 is a view illustrating a controller according to yet another embodiment of the present invention.

FIG. 10 is a view illustrating a controller 50 according to yet another embodiment of the present invention.

Referring to FIG. 10, the armrest 2 may include a controller 50 which controls the heat generation of the heat exchange member 22 and the heating element 300. The controller 50 may include a temperature controller 51 which sets a temperature of each of the heat exchange member 22 and the heating element 300 and may further include a heating controller 52 which monitors whether the temperature of each of the heat exchange member 22 and the heating element 300 corresponds to a set temperature.

The temperature controller 51 may set the temperature in predetermined stages. The predetermined stages may be predetermined stages or stages set by the user.

The user may control the temperature in the predetermined stages through the temperature controller 51. The predetermined stages of the temperature which is predetermined by the temperature controller 51 may be determined by at least one of conditions such as a current, a voltage and a resistance. The temperature controller 51 may include a control circuit (not shown) which controls a control signal including one or more of the current, the voltage and the resistance, which is input to the heat exchange member 22 and the heating element 300.

The control circuit may control a signal pulse including pulse width modulation and a process identifier (PID), which is input to the heat exchange member 22 and the heating element 300.

Also, the control circuit may include a plurality of signal lines corresponding to the predetermined stages to transmit the control signal input to the heat exchange member 22 and the heating element 300. The plurality of signal lines may be determined according to the stages which distinguishes the signal input to the heat exchange member 22 and the heating element 300. For example, according to the signal input to the heat exchange member 22 and the heating element 300, the signal lines such as a signal line input in a first stage of the signal and a signal line input in a second stage thereof may be formed in the stages.

Also, the heating controller 52 may monitor the temperature of each of the heat exchange member 22 and the heating element 300 to maintain the temperature set in each of the heat exchange member 22 and the heating element 300. The heating controller 52 may include an overheating prevention unit (not shown) which cuts off the power applied to each of the heat exchange member 22 and the heating element 300 when the temperature is increased to the predetermined temperature or more. The overheating prevention unit may include a switching unit (not shown) which cuts off or applies the power according to a predetermined set value. The predetermined set value of the overheating prevention unit may be determined by a safety detection signal including one or more of the temperature, the current and the resistance. For example, the overheating prevention unit may set the set value predetermined by the safety detection signal of the temperature, the current and the resistance into a primary limit value and a secondary limit value. When it reaches the primary limit value, a signal input to the heat exchange member 22 and the heating element 300 may be blocked, and when it reaches the secondary limit value, the signal input to the heat exchange member 22 and the heating element 300 may be applied again. Specifically, the primary limit value may include a primarily set temperature, and when it exceeds the primarily set temperature, the signal input to the heat exchange member 22 and the heating element 300 may be blocked, and thus the power may be cut off. The secondary limit value may include a secondarily set temperature, and the secondarily set temperature may be set lower than the primarily set temperature. Therefore, when it reaches the secondarily set temperature, the signal is applied to the heat exchange member 22 and the heating element 300, and thus the power is applied again.

Figure 11:
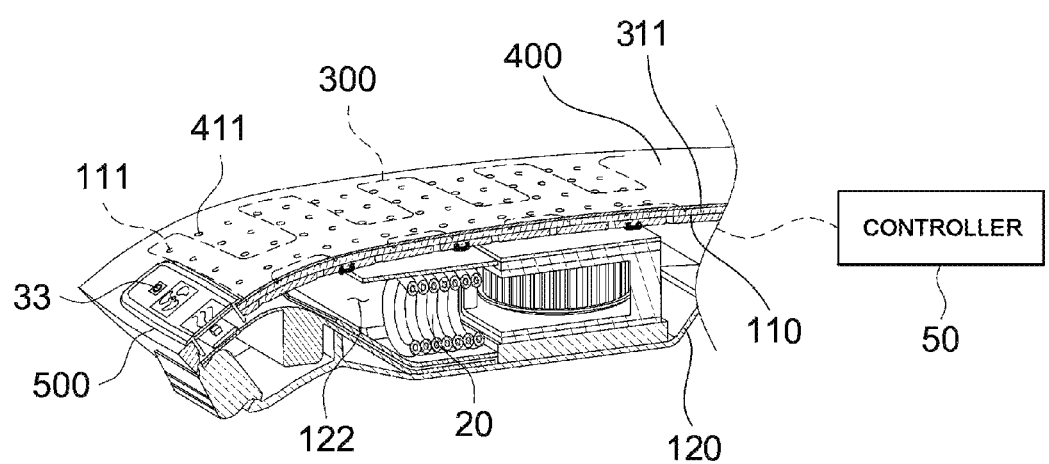
FIG. 11 is a perspective view illustrating an armrest according to yet another embodiment of the present invention.
Figure 12:
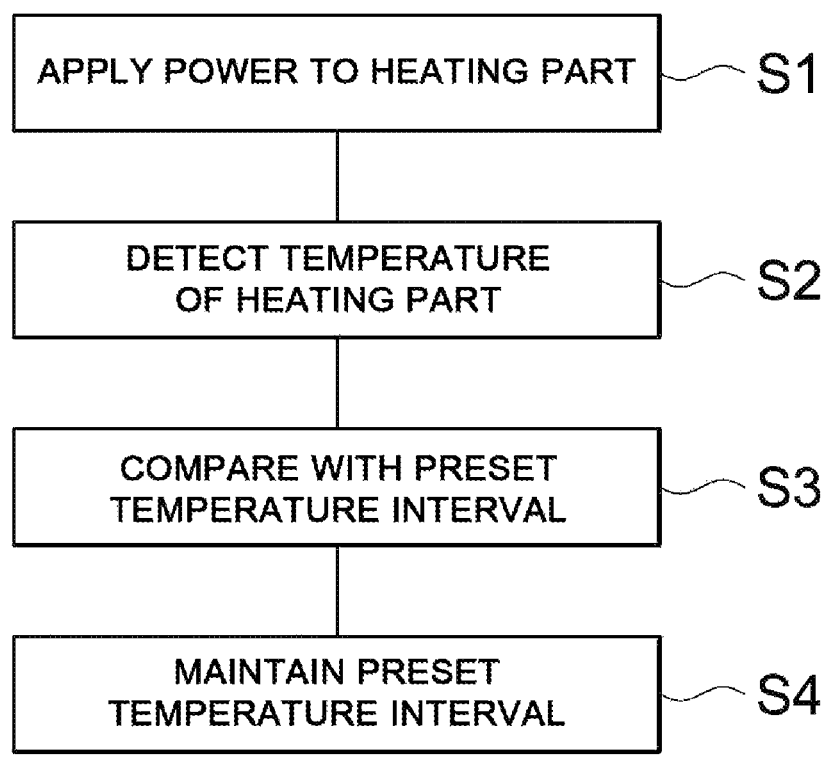
FIG. 12 is a flowchart illustrating a control sequence of the heating part controlled by the controller according to yet another embodiment of the present invention.

FIG. 11 is a perspective view illustrating an armrest 2 according to yet another embodiment of the present invention, and FIG. 12 is a flowchart illustrating a control sequence of the heating part 320 controlled by the controller 50 according to one embodiment of the present invention.

Figure 13:
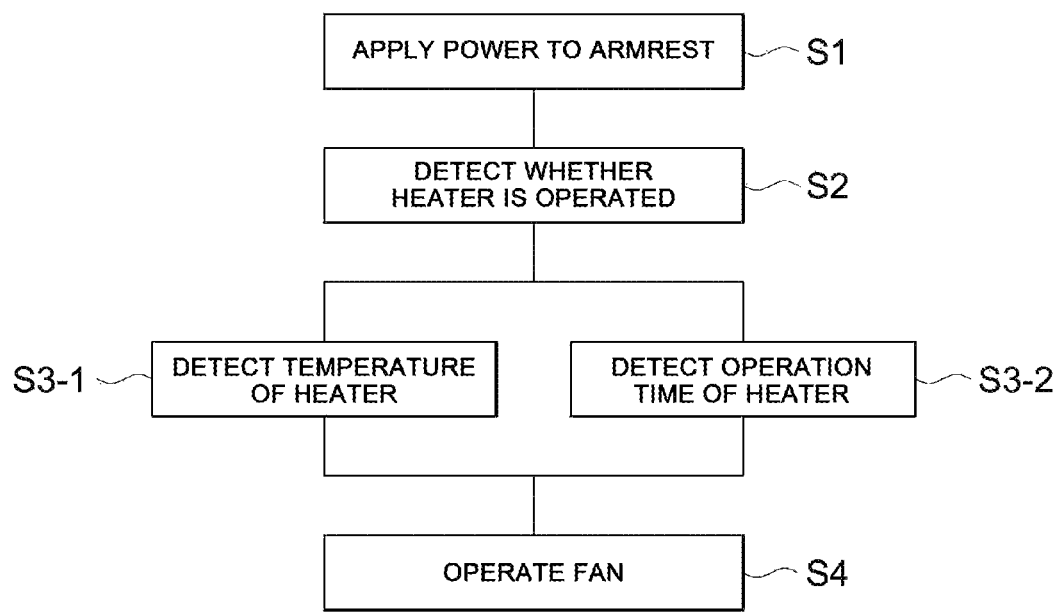
FIG. 13 is a flowchart illustrating a control sequence of the fan controlled by the controller according to yet another embodiment of the present invention.

The armrest 2 illustrated in FIG. 11 may be operated by a control method of FIGS. 12 and 13. Hereinafter, the control method will be described with reference to FIGS. 11 to 13.

As described above, since the heating part 320 includes at least one of the heating element 300 and the infrared heater 20 according to one embodiment of the present invention, the heating part 320 controlled by the controller 50 may be the heating element 300 and the infrared heater 20. Also, a detecting part which is not illustrated includes an external temperature detecting part which detects a temperature outside the armrest 2, an internal temperature detecting part which detects a heating temperature of the heating part 320 and an operation detecting part which detects an operation time of the heating part 320. The detecting part may be connected to the controller 50 and may transmit temperature information and operation time information to the controller 50.

Referring to FIG. 12, the armrest 2 may be controlled in four stages by the controller 50. Sequentially, the control method may include an operation P1 of applying the power to the heating part 320, an operation P2 of detecting a temperature of the heating part 320 by the detecting part, an operation P3 of comparing the detected temperature with the predetermined temperature, and an operation P4 of operating and stopping the heating part 320 and the fan 200 to maintain a predetermined temperature interval.

Here, in the operation P1 of applying the power to the heating part 320, the power supplied by an external or internal power supplying unit is applied, and the power supplying unit may be a battery. The heating part 320 which receives the power by the power to supplying unit may be heated.

Also, the temperature of the heated heating part 320 may be detected by the detecting part (P2), and the detected temperature may be compared with the predetermined temperature (P3). For example, when the temperature of the heating part 320 is lower than the predetermined temperature, the heating may be continued, and when the temperature of the heating part 320 is higher than the predetermined temperature, the heating of the heating part 320 may be stopped by a method of cutting off the power or the like.

Also, the predetermined temperature interval may be maintained by controlling the heating of the heating part 320. Since the air may be heated within the temperature interval, the armrest 2 may be prevented from being damaged due to overheating.

FIG. 13 is a flowchart illustrating a control sequence of the fan controlled by the controller according to yet another embodiment of the present invention.

Referring to FIGS. 11 and 13, the controller 50 may control the operation of the fan 200 based on the information received from the detecting part. The operation of the fan 200 may be determined based on the temperature of the heating part 320 or the operation time of the heating part 320.

Four stages according to the temperature of the heating part 320 may be included. The four stages may include an operation S1 of applying the power to the armrest, an operation S2 of detecting whether the heating part 320 is operated by the detecting part, an operation S3-1 of detecting the temperature of the heating part 320 by the internal temperature detecting part when the heating part 320 is operated, and an operation S4 of operating the fan when the temperature of the heating part 320 reaches the predetermined temperature or more.

Here, in the operation S1 of applying the power, the power is applied to the armrest 2. This means that the power is supplied to a peripheral device, such as the fan 200 and the heating part 320 included in the armrest 2, in which the power supplying is required.

In the operation S2 of detecting whether the heating part 320 is operated, the heating part 320 may be operated while the power is supplied in the previous operation S1. Here, when the heating part 320 is not being operated, the previous operation S1 may be performed again. Therefore, in the operation S2 of detecting whether the heating part 320 is operated, when the operation of the heating part 320 is detected, the operation S3-1 of detecting the temperature of the heating part 320 may be performed. In this case, the temperature of the heating part 320 may be compared with the predetermined temperature. When the temperature of the heating part 320 does not reach the predetermined temperature while the heating part 320 is heated, the heating part 320 may be continuously heated. That is, the heating of the heating part 320 may be maintained until the heating temperature of the heating part 320 reaches the predetermined temperature. When the heating part 320 is continuously heated and the temperature reaches the predetermined temperature, the operation S4 of operating the fan may be performed. Here, the predetermined temperature may be a temperature by which the air becomes a warm air flow having a predetermined temperature when being heated by the heating part 320 and discharged outside the armrest 2 by the fan 200. For example, the predetermined temperature may be 70 to 110□.

Also, a process in which the air is discharged outside the armrest 2 may be related to not only the temperature of the heating part 320 but also the operation time of the heating part 320.

The process may also include four stages. The four stages may include an operation S1 of applying the power to the armrest, an operation S2 of detecting whether the heating part 320 is operated by the detecting part, an operation S3-2 of detecting the operation time of the heating part 320 from an operation starting time point by the operation detecting part when the heating part 320 is operated, and an operation S4 of operating the fan when the temperature of the heating part 320 reaches the predetermined temperature or more.

Here, in the operation S1 of applying the power, the power is applied to the armrest 2. This means that the power is supplied to the peripheral device, such as the fan 200 and the heating part 320 included in the armrest 2, in which the power supplying is required. In the operation S2 of detecting whether the heating part 320 is operated, the heating part 320 may be operated while the power is supplied in the previous operation S1. Here, when the heating part 320 is not being operated, the previous operation S1 may be performed again. Therefore, in the operation S2 of detecting whether the heating part 320 is operated, when the operation of the heating part 320 is detected, the operation S3-2 of detecting the operation of the heating part 320 may be performed. When a predetermined time passes from the operation starting time point of the heating part 320, the operation S4 of operating the fan may be performed. Here, the predetermined time may be a time while the temperature of the heating part 320 is increased and reaches a temperature at which the air may be heated. That is, the heating of the heating part 320 may be maintained until the heating temperature of the heating part 320 reaches the predetermined temperature. For example, the predetermined time may be 5 to 30 seconds. When the predetermined time passes, the heating part 320 which is continuously heated may perform the operation S4 of operating the fan. Here, the predetermined temperature may be a temperature by which the air becomes a warm air flow having a predetermined temperature when being heated by the heating part 320 and discharged outside the armrest 2 by the fan 200.

Figure 14:
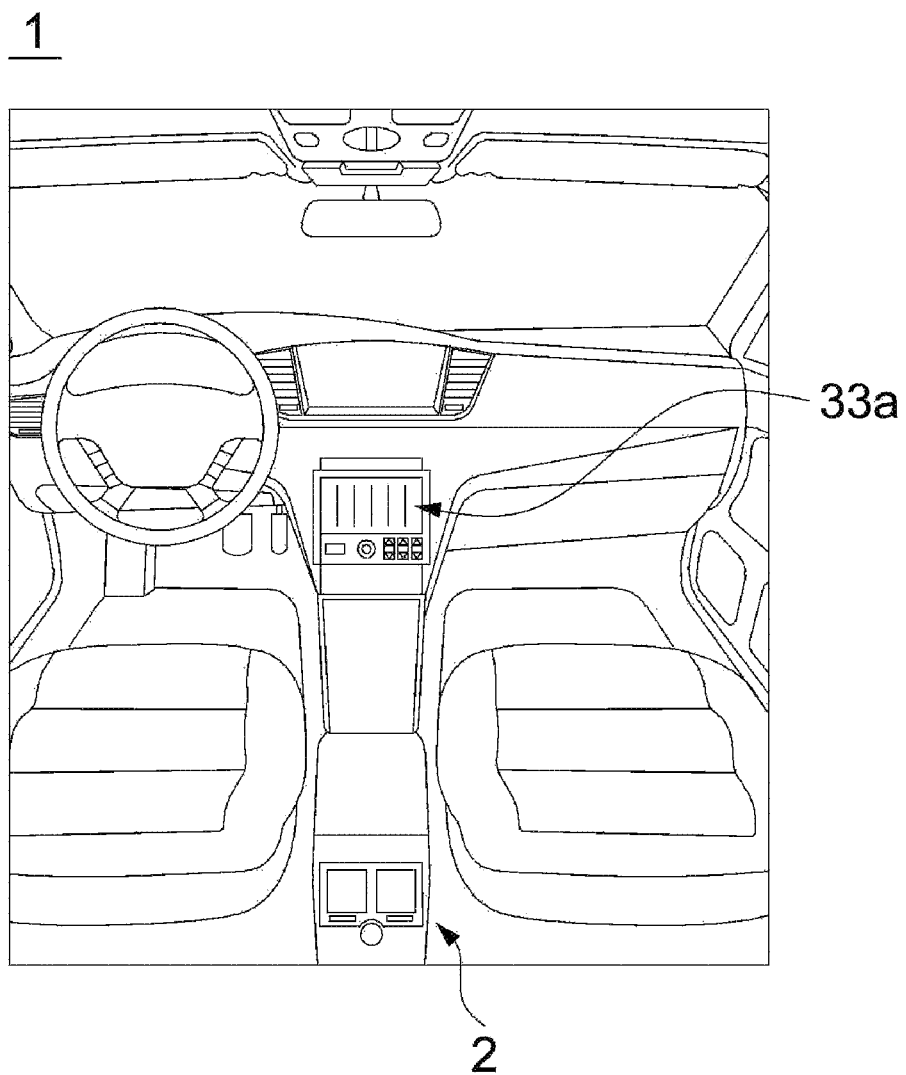
FIG. 14 is a view illustrating a state in which the armrest according to yet another embodiment of the present invention is controlled by a separate operating part in a vehicle.

FIG. 14 is a view illustrating a state in which the armrest 2 according to yet another embodiment of the present invention is controlled by a separate operation part 33a in the vehicle 1.

A control method of the armrest 2 according to one embodiment of the present invention may detect the temperature outside the armrest 2 by the external temperature detecting part, may transmit the detected temperature to the controller 50 and may control the operation of the heating part 320 and the fan 200 to reach a target temperature which is an internal temperature of the vehicle 1 and the external temperature of the armrest 2 set by the user.

One embodiment of the present invention can include the reinforcing member which supports a predetermined load and can provide the armrest which prevents an upper portion of the armrest from sinking downward by the reinforcing member.

And one embodiment of the present invention can provide the armrest which controls the heating of the heating element and the blowing of the air using the operating part included in the armrest or the operating part formed inside the vehicle.

Also, one embodiment of the present invention can provide the armrest in which the first through-hole and the second through-hole through which the air discharged by the fan included in the armrest passes are disposed to cross each other, and thus the air is allowed to pass through the heat-exchanging point via the heating element while being discharged.

One embodiment of the present invention can provide the armrest which includes the infrared heater and in which radiant energy emitted from the infrared heater is reflected and reused to heat the air discharged outside the armrest.

And one embodiment of the present invention can provide the armrest in which the heating element for transferring heat to the user through heat conduction is disposed at the outer surface of the case.

Also, one embodiment of the present invention can provide the armrest in which the infrared heater is located at the outlet passage through which the air is discharged, and located to extend in the flowing direction of the air to prevent the pressure drop of the discharged air.

Also, one embodiment of the present invention can provide the armrest in which the infrared heater is disposed to be spaced a predetermined distance from the heat reflecting member, thereby increasing utilization of the radiant heat reflected by the heat reflecting member.

The embodiments of the present invention can provide the armrest in which the through-holes are formed at a portion thereof on which the user's arm is put and the air or the warm air can be directly blown to the user's arm.

Also, the embodiments of the present invention can provide the armrest in which the heat exchange member is disposed therein to discharge the air having a temperature for user convenience into the vehicle.

Also, the embodiments of the present invention can provide the armrest in which the air corresponding to a peripheral temperature is discharged into the vehicle, thereby providing a more pleasant environment.

One embodiment of the present invention can provide the armrest which includes the controller and in which the heating part and the fan are controlled by the controller.

And one embodiment of the present invention can provide the armrest in which the controller transmits the operation and stop signal by receiving and reflecting information of the heating part, the fan and the temperature and the operation thereof.

Also, one embodiment of the present invention can provide a method of controlling the fan of the armrest, which is controlled by the controller.

It will be apparent to those skilled in the art that various modifications can be made to the above-described exemplary embodiments of the present invention without departing from the spirit or scope of the invention. Thus, it is intended that the present invention covers all such modifications provided they come within the scope of the appended claims and their equivalents.

What is claimed is:

1. An armrest comprising:
    a case having a passage of which an inside and an outside are in communication with each other and a through-hole which is formed to allow air to be discharged outward;
    a fan configured to allow the air to be introduced and discharged through the passage;
    a heating part located at a route through which the air is moved and configured to generate radiant heat; and
    a heat reflecting member disposed inside the case to reflect the radiant heat generated from the heating part and then to provide the reflected radiant heat to the route through which the air is moved.

2. The armrest of claim 1, wherein the heating part is an infrared heater, and the infrared heater is formed in one of a coil shape, a bar shape, a board shape and an arch shape.

3. The armrest of claim 1, wherein the passage includes an inlet passage through which the air is introduced and an outlet passage through which the air is discharged, and the inlet passage and the outlet passage are formed at a front side and a rear side of the fan based on an air flowing direction, and the heating part is located inside the outlet passage.

4. The armrest of claim 1, further comprising a cover member which is disposed to prevent the heating part from being damaged from an external shock.

5. The armrest of claim 1, wherein the heat reflecting member includes at least one or more surfaces which reflect the radiant heat upward.

6. An armrest comprising:
    a passage formed inside a case which forms an exterior and through which air is introduced and guided;
    a fan disposed inside the passage and configured to circulate the introduced air into a vehicle;
    one or more heat exchange members configured to heat the air moved by the fan;
    one or more heating elements located at one side of an upper case forming an upper portion of the case and configured to heat an upper surface thereof; and
    a controller configured to control the heat exchange member and an heating operation of the heating element.

7. The armrest of claim 6, wherein the controller includes a temperature controller which sets a temperature of each of the heat exchange member and the heating element; and a heating controller which monitors whether each of the heat exchange member and the heating element corresponds to a set temperature.

8. The armrest of claim 7, wherein the temperature controller allows a user to adjust a temperature to a predetermined stage.

9. The armrest of claim 7, wherein the temperature controller includes a control circuit which controls a control signal including one or more of a current, a voltage and a resistance to set a predetermined stage of the temperature.

10. The armrest of claim 9, wherein the control circuit includes a plurality of signal lines corresponding to predetermined stages to transmit a control signal input to the heat exchange member and the heating element.

* * * * *